US006766527B2

(12) United States Patent
Tsutsui et al.

(10) Patent No.: US 6,766,527 B2
(45) Date of Patent: *Jul. 20, 2004

(54) CATV SYSTEM, CATV DISTRIBUTOR, PROCESSING TERMINAL, AND RECEIVER

(75) Inventors: Seiji Tsutsui, Kawasaki (JP); Shigeru Oizumi, Kawasaki (JP); Tomoyoshi Suzuki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/643,012

(22) Filed: May 3, 1996

(65) Prior Publication Data

US 2002/0046408 A1 Apr. 18, 2002

(30) Foreign Application Priority Data

Jun. 30, 1995 (JP) .............................. 7-164384

(51) Int. Cl.[7] .............................................. H04N 7/173
(52) U.S. Cl. .................... 725/102; 725/102; 725/87; 725/88; 725/99; 725/100; 725/133; 725/151; 725/131; 725/139; 725/141; 725/153; 455/3.01; 455/3.02; 455/3.03; 455/3.04; 455/3.05; 455/3.06; 348/14.01; 348/14.02; 348/14.03; 348/14.04; 348/14.05; 348/14.06; 348/14.07
(58) Field of Search ............................. 348/6, 7, 9, 10, 348/12, 13, 14.01–14.07; 455/3.1, 4.1, 4.2, 5.1, 6.1, 6.2; 725/58, 88, 99–100, 102, 133, 136, 141, 153, 132, 140, 152, 151; H04N 7/173

(56) References Cited

U.S. PATENT DOCUMENTS 5,361,091 A * 11/1994 Hoarty ........................ 348/7

(List continued on next page.)

FOREIGN PATENT DOCUMENTS

| JP | 4-84589 | 3/1992 |
| JP | 6-18847 | 1/1994 |
| JP | 6-188847 | 7/1994 |
| JP | 6-217271 | 8/1994 |
| JP | 6-351019 | 12/1994 |
| JP | 07-059166 | 3/1995 |
| WO | WO 95/13681 | 11/1994 |

OTHER PUBLICATIONS

Tetsuo Kikuchi, English Language Abstract & JP–6–18847, Jan. 28, 1994.
Notice of Reasons for Rejection (and English Translation) mailed Jun. 10, 2003, from the Japanese Patent Office in corresponding Japanese Patent Application No. 8–170478.

*Primary Examiner*—Shawn S. An
(74) *Attorney, Agent, or Firm*—Staas & Halsey LLP

(57) ABSTRACT

In a processing terminal, operational request information inputted from an operational request unit is transmitted as additional information to a communication unit of a CATV distributor. In the CATV distributor, the additional information is received in the communication unit, and when the additional information is the operational request information, an operational command generator generates operational command information corresponding to the operational request information. The operational command information is transmitted to a communication unit of a receiver through the communication unit. In the receiver, as the communication unit receives the operational command information for the receiver, an operating unit operates the receiver to perform the desired operation in response to the operational command information.

4 Claims, 14 Drawing Sheets

U.S. PATENT DOCUMENTS

| | | | | |
|---|---|---|---|---|
| 5,416,508 A | * | 5/1995 | Sakuma et al. | 348/10 |
| 5,485,219 A | * | 1/1996 | Woo | 348/460 |
| 5,488,412 A | * | 1/1996 | Majeti | 348/12 |
| 5,499,047 A | * | 3/1996 | Terry | 348/6 |
| 5,517,257 A | * | 5/1996 | Dunn et al. | 348/7 |
| 5,528,582 A | * | 6/1996 | Bodeep | 348/13 |
| 5,561,708 A | * | 10/1996 | Remillard | 348/7 |
| 5,585,858 A | * | 12/1996 | Harper | 348/12 |
| 5,621,456 A | * | 4/1997 | Florin et al. | 348/7 |
| 5,642,155 A | * | 6/1997 | Cheng | 348/12 |
| 5,682,325 A | * | 10/1997 | Lightfoot et al. | 725/99 |
| 5,790,174 A | * | 8/1998 | Richard, III et al. | 725/99 |
| 5,812,929 A | * | 9/1998 | Tsutsui | 348/12 |

\* cited by examiner

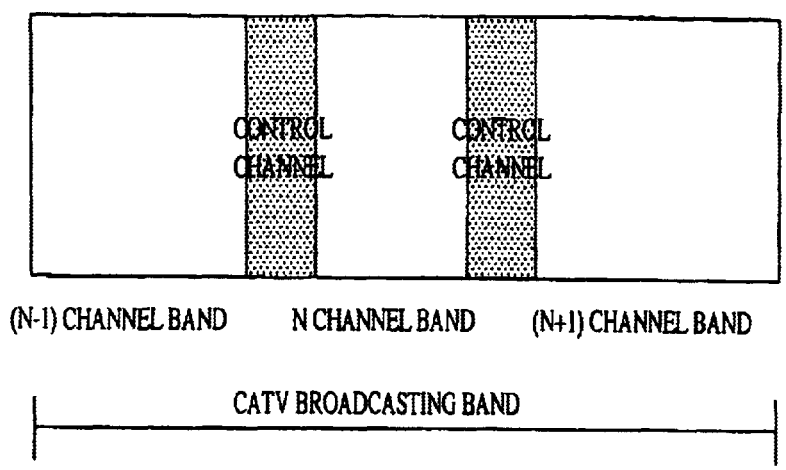
FIG. 8
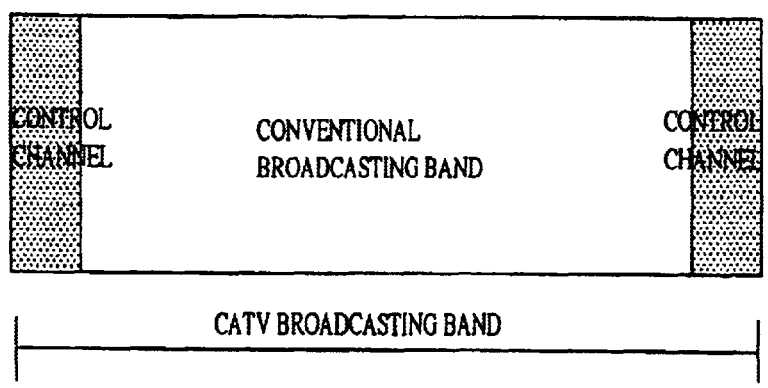
FIG. 9
FIG. 6
| ORIGINATING SIDE IDENTIFIER | ADDRESSEE IDENTIFIER | USER ID & PASSWORD | CONTENT OF TRANSMISSION | STATUS OF RECEIVER |
|---|---|---|---|---|

FIG. 7

| ORIGINATING SIDE/ ADDRESSEE IDENTIFIER | CODE |
|---|---|
| CATV DISTRIBUTOR | |
| FIRST TV RECEIVER | |
| SECOND TV RECEIVER | |
| VCR | |
| PERSONAL COMPUTER | |

| STATUS OF RECEIVER | CODE |
|---|---|
| POWER IS OFF | |
| POWER IS ON | |
| REGENERATING | |
| | |
| | |

| CONTENT OF TRANSMISSION | CODE |
|---|---|
| TURN ON | |
| TURN OFF | |
| START RECORD | |
| OBTAIN STATUS | |
| TRANSMIT STATUS | |

| USER ID & PASSWORD | CODE |
|---|---|
| USER ID | |
| PASSWORD | |
| | |

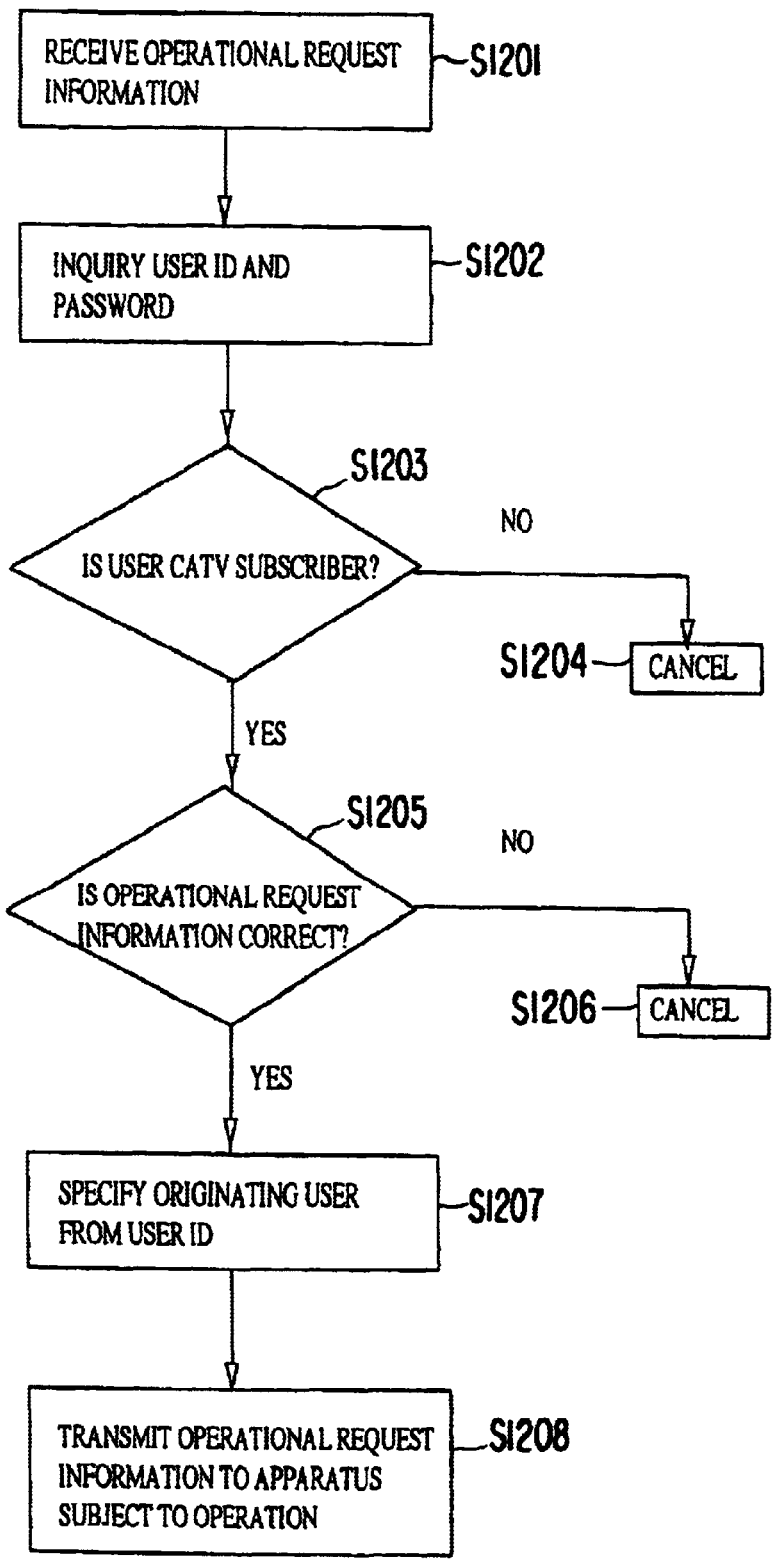

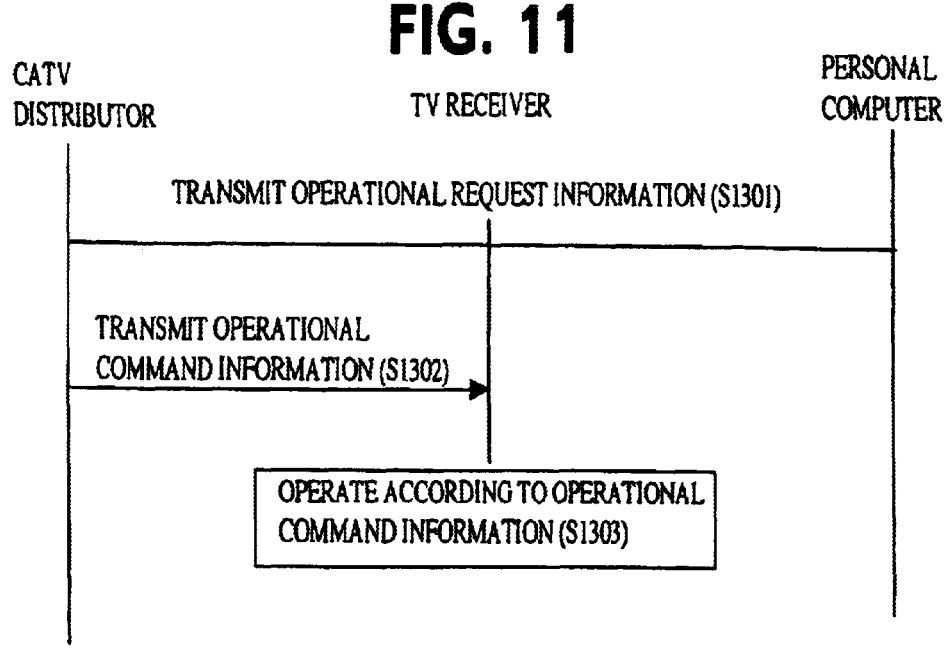
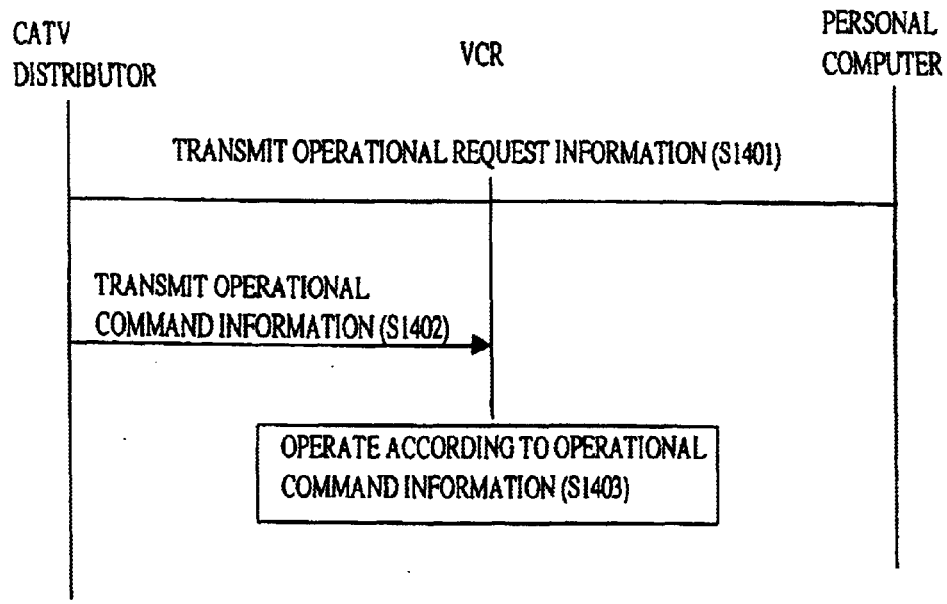

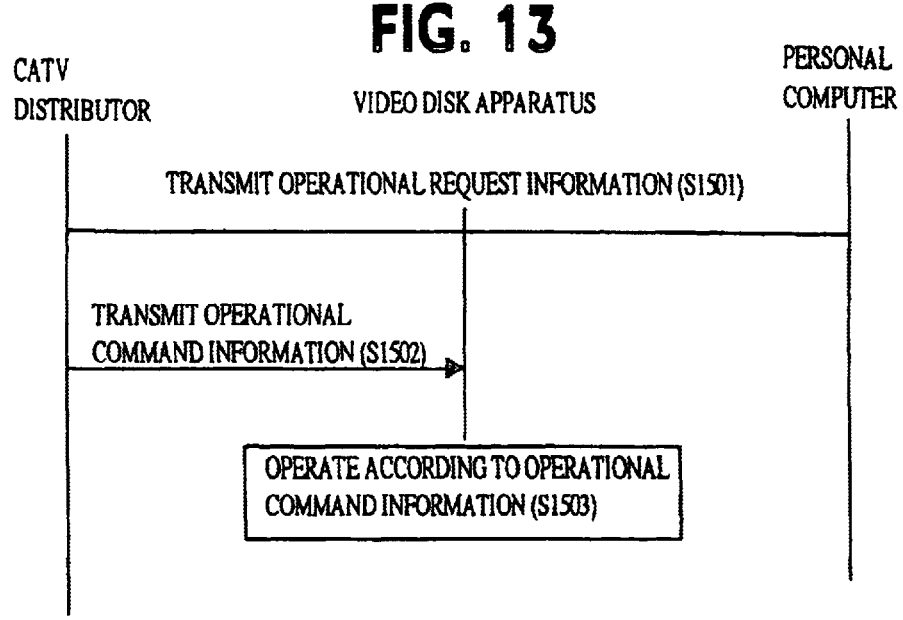
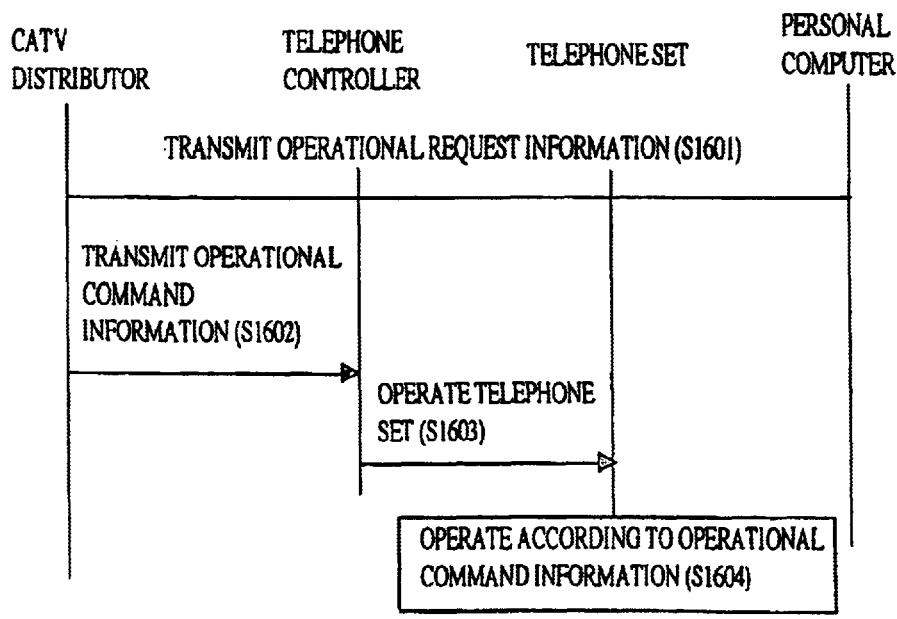

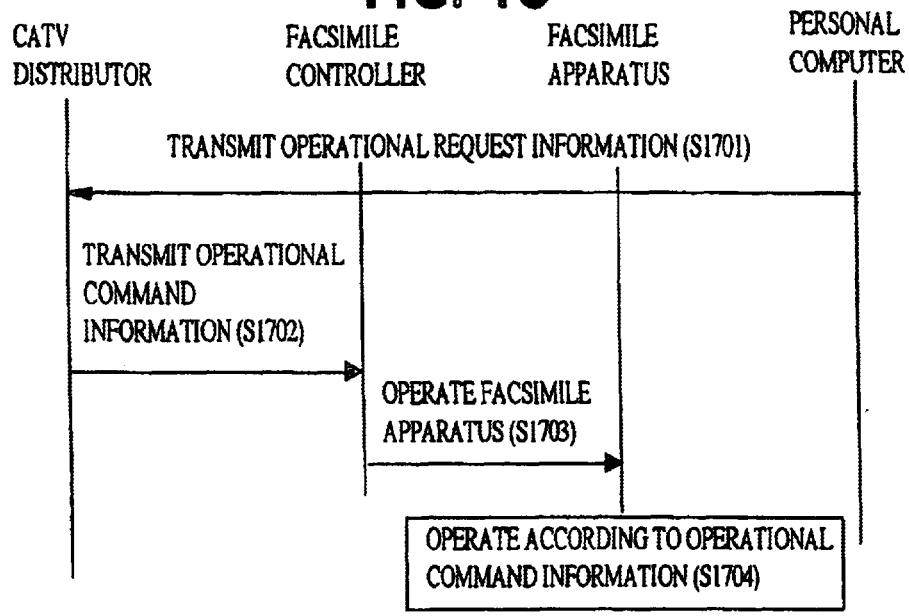
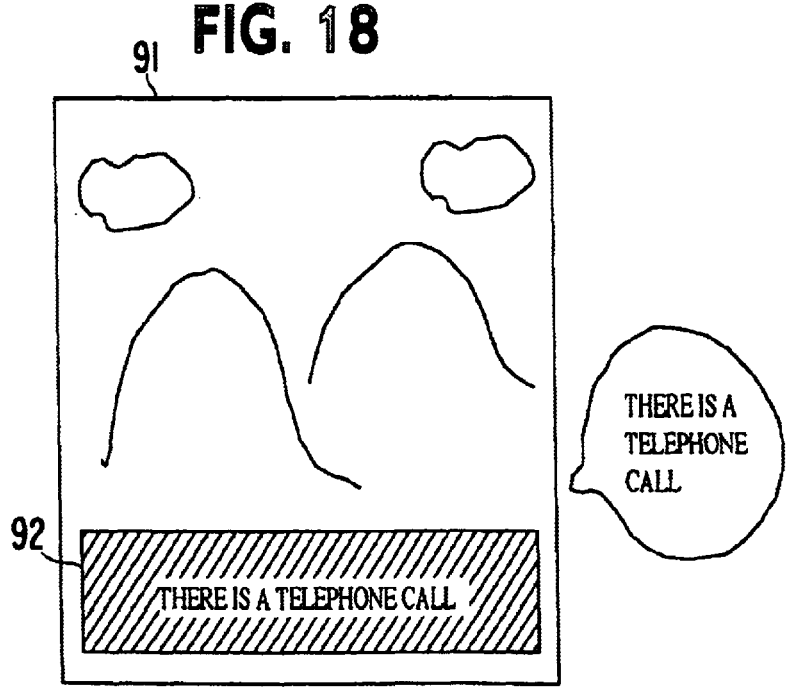

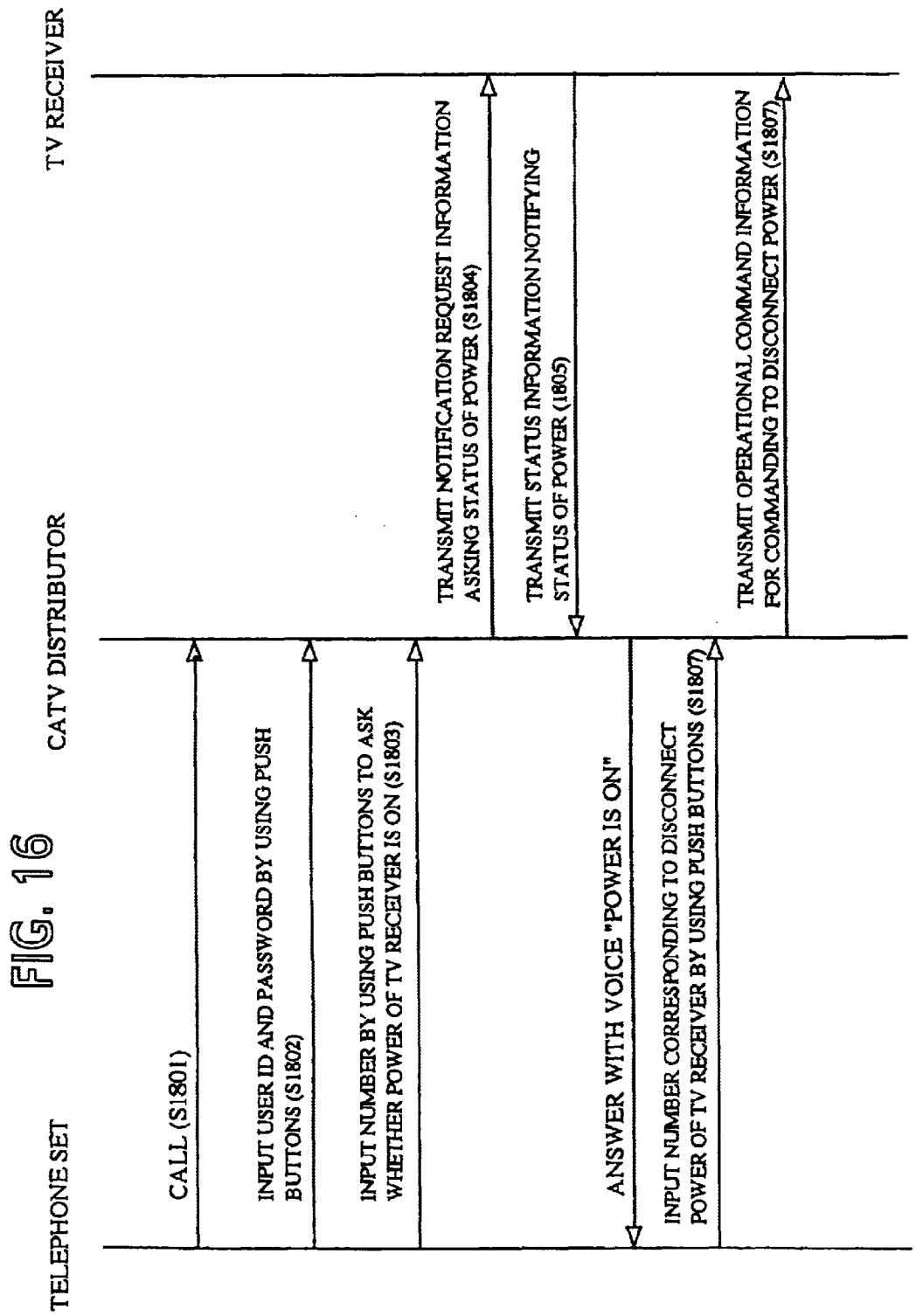

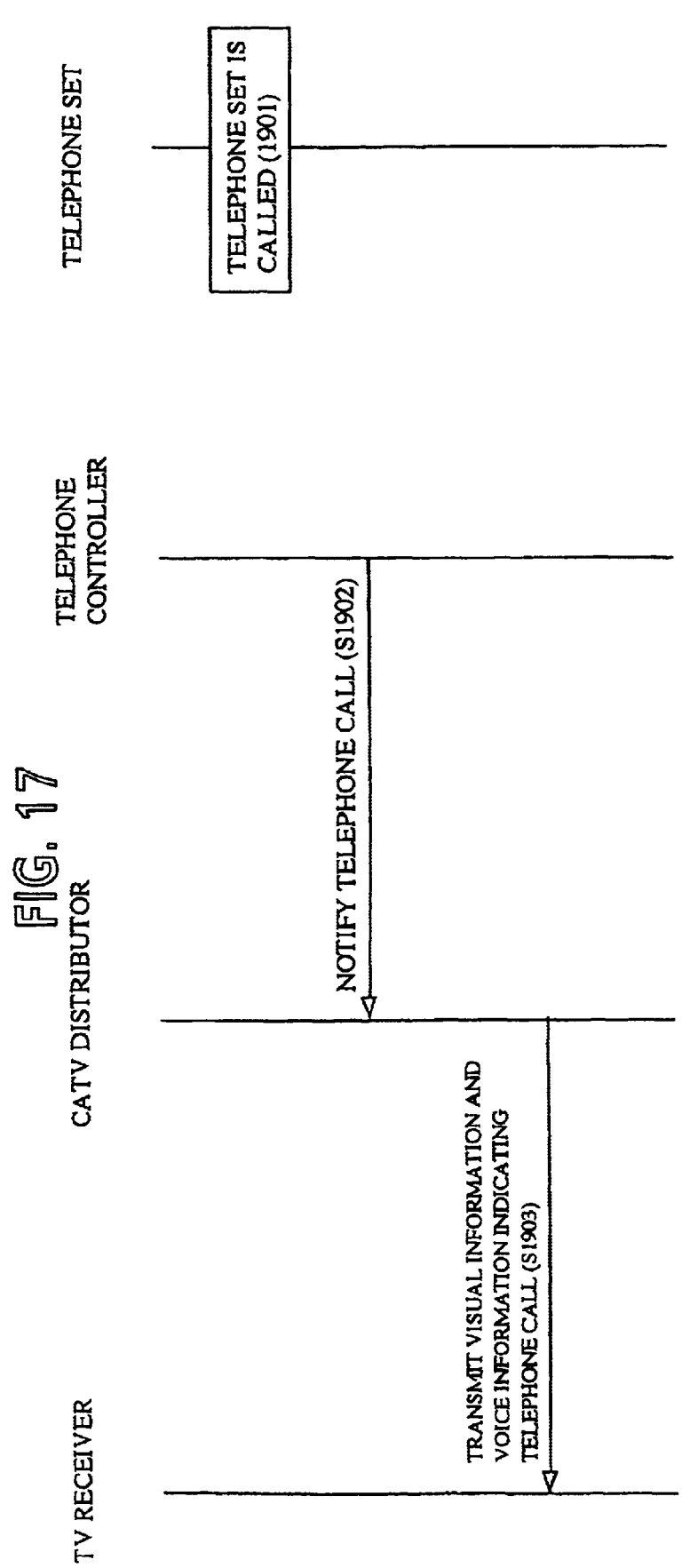

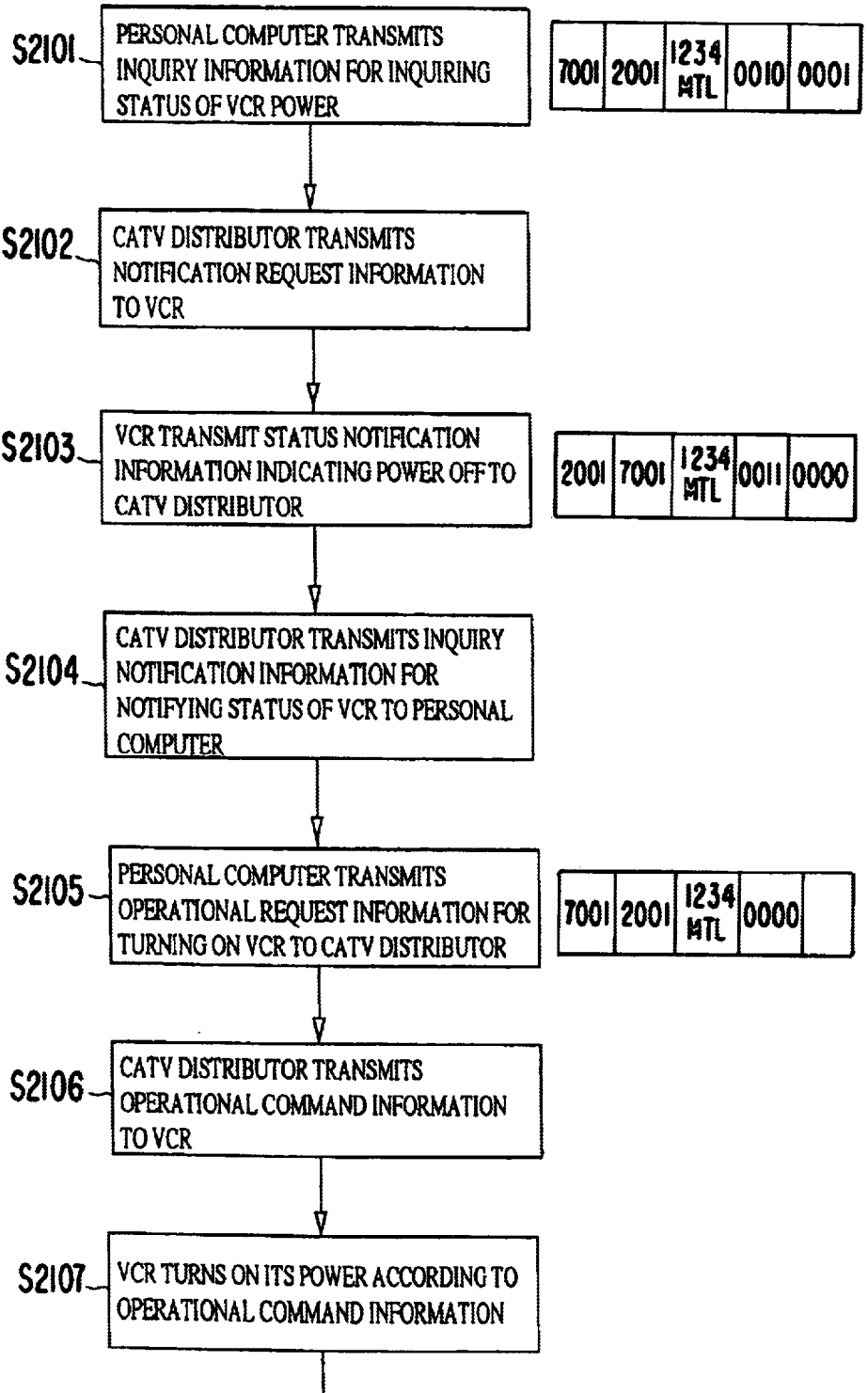

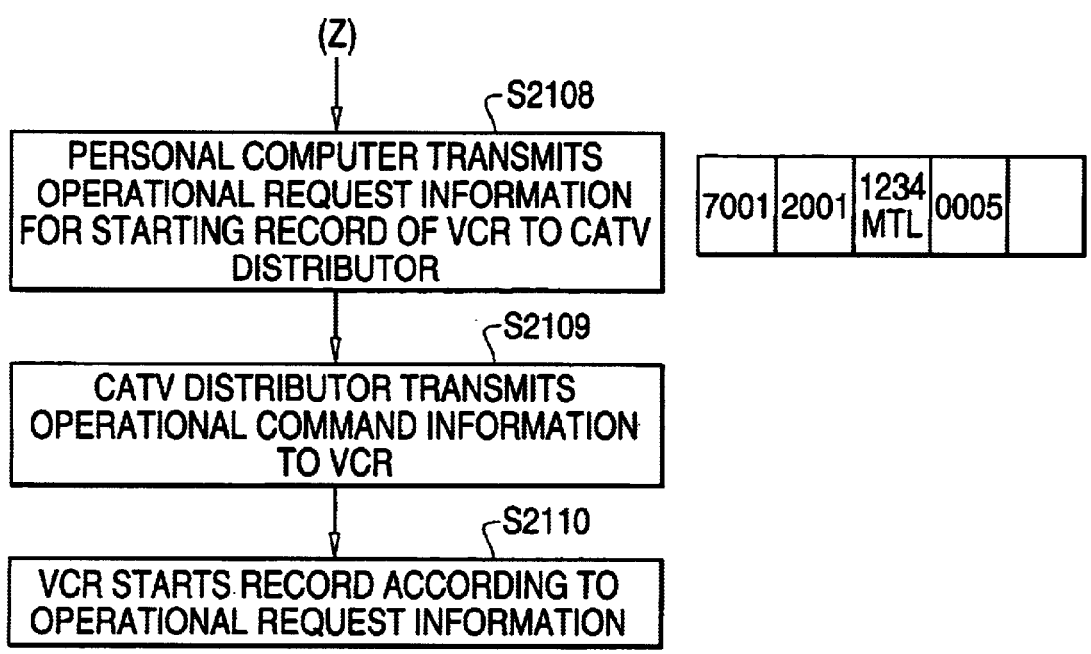

CATV SYSTEM, CATV DISTRIBUTOR, PROCESSING TERMINAL, AND RECEIVER

BACKGROUND OF THE INVENTION

1. Field of the Invention

The present invention relates to a CATV system, called as a cable television system, more particularly to a CATV system for two-way communication, and to a CATV distributor, a processing terminal, and a receiver used in the CATV system.

2. Description of the Related Art

CATV is an abbreviation for community antenna TV (television), cable and communication TV, or cable TV and generally called as "cable television" or the like. CATV system is a television distribution system in which a CATV distributor located in a CATV central station is connected to subscribers' TV receivers via broad-band transmission cable such as coaxial cable or optical fiber cable which has or relates to a wide band of electromagnetic frequencies, thereby supplying programs from the CATV distributor to the subscribers' TV receivers.

In such a CATV system, a multiple program channels through telecasting by way of grand wave such as VHF (very high frequency) and UHF (ultrahigh frequency), and communication-satellite broadcasting transmitted via communication satellite are provided from the CATV distributor to the subscribers through the broad-band transmission cable.

A conventional CATV system is mainly structured for transmitting visual information on one way basis from a CATV distributor to subscribers. Then, information from the subscribers to the CATV distributor is quite limited for example only selection of program channels. As a result, the CATV system is still at the level of a substitute for a TV by way of grand wave with extended number of program channels and for a video recorder such as VCR (video cassette recorder).

As mentioned above, CATV system has limited services. This is one of reasons to deter the spread of CATV system.

SUMMARY OF THE INVENTION

The first object of the present invention is to provide a CATV system which has an improved two-way communication function between a CATV central station and subscribers, permits not only distribution of broadcasting information but also communication for additional information therebetween, and allows another device connected to the CATV distributor to control subscribers' devices connected to the CATV distributor.

The second object of the present invention is to provide a CATV system which permits not only distribution of broadcasting information but also communication for additional information via transmission lines for broadcasting, and allows the linkage communication among the CATV distributor, subscribers' receivers, and another device which are connected to the CATV distributor.

The third object of the present invention is to provide a CATV distributor which permits communication with subscriber' devices for additional information other than broadcasting information, and can provide extended services using the additional information.

The fourth object of the present invention is to provide a processing terminal which permits communication with a CATV distributor for additional information other than broadcasting information, and can receive extended services using the additional information.

The fifth object of the present invention is to provide a receiver which permits communication with a CATV distributor for additional information other than broadcasting information, and can receive extended services using the additional information.

A CATV system according to a first aspect of the present invention comprises: a CATV distributor located in a CATV central station for distributing broadcasting information and for transmitting and receiving additional information other than the broadcasting information; at least one receiver located at a subscriber's side for receiving the broadcasting information transmitted from the CATV distributor and/or for responding to the additional information transmitted from the CATV distributor; and a processing terminal located in the subscriber's side for transmitting and receiving the additional information to and from the CATV distributor and for responding to the additional information received therein.

A CATV system according to a second aspect of the present invention comprises: a CATV distributor located in a CATV central station connected to a subscriber's side by transmission lines for multiple channels including broadcasting channels and additional information channels, the CATV distributor distributing broadcasting information through the broadcasting channels and transmitting and receiving additional information, other than the broadcasting information, through the additional information channels; at least one receiver located at the subscriber's side for receiving the broadcasting information transmitted from the CATV distributor through the broadcasting channels and/or for responding to the additional information transmitted from the CATV distributor through the additional information channels; and a processing terminal located in the subscriber's side for transmitting and receiving the additional information to and from the CATV distributor through the additional information channels and for responding to the additional information received therein. The additional information channels are two-way communication channels.

The processing terminal may include an operational requesting means for inputting operational request information for requesting an operation of the receiver and a first communication means for transmitting the operational request information, inputted from the operational requesting means, as the additional information to the CATV distributor, the CATV distributor may include an operational command generating means for generating operational command information for commanding the operation of the receiver according to the operational request information and a second communication means for transmitting and receiving the additional information, when the additional information is the operational request information, the second communication means providing the operational request information to the operational command generating means and transmitting the operational command information generated by the operational command generating means, as the additional information to the receiver, and the receiver may include a third communication means for receiving the additional information; and an operating means for operating in response to the operational command information when the additional information received by the third communication means is the operational command information.

The operational requesting means may include a means for inputting operational request information for requesting an operation of the processing terminal itself, the operational command generating means may include a means for generating operational command information for commanding the operation of the processing terminal according to the operational request information, and the second communication means may include a means for transmitting the operational command information as the additional information to the processing terminal when the operational command information generated by the operational command generating means is for commanding the operation of the processing terminal.

The processing terminal may have an inquiry requesting means for inputting inquiry request information for requesting to inquire the status of the receiver, the first communication means may therefore include a means for transmitting the inquiry request information, inputted from the inquiry requesting means, as the additional information to the CATV distributor, the CATV distributor may have a status request generating means, according to the inquiry request information when the additional information received by the second communication means is the inquiry request information, for generating status request information for requesting to notify the status of the receiver, the second communication means may therefore include a means for transmitting the status request information, generated by the status requesting means, as the additional information to the receiver, the receiver may have a status information generating means which, when the additional information received by the third communication means is the status request information, generates status information indicating the status as requested, the third communication means may therefore include a means for transmitting the status information, generated by the status generating means, as the additional information to the CATV distributor, and the CATV distributor may also has a status notification generating means, according to the status information, for generating status notifying information for notifying the status of the receiver, the second communication means may therefore include a means for transmitting the status notifying information generated by the status notification generating means to the processing terminal.

The receiver may be a TV receiver, and the processing terminal may be designed to make at least one of requests of controlling on and off of the TV receiver, changing the video channel, changing the audio channel, controlling the level of regenerative sound volume, and setting the time, as the operational request information.

The receiver may be a video recorder for recording and regenerating video information in a recording medium, and the processing terminal may be designed to make at least one of requests of controlling on and off of the video recorder, changing the received video channel, changing the audio channel in a sound multiplex system, controlling the level of regenerative sound volume, setting the time, setting the operation of reservation, inserting the recording medium, ejecting the recording medium, playing the recording medium, stopping the play of the recording medium, fast-forwarding the recording medium, rewinding the recording medium, starting the record to the recording medium, stopping the record to the recording medium, pausing the play of the recording medium, canceling the pause of the play of the recording medium, pausing the record to the recording medium, and canceling the pause of the record to the recording medium, as the operational request information.

The video recorder may be a video cassette recorder and the recording medium may be a video cassette.

The video recorder may be a video disk recorder and the receding medium may be a video disk.

The receiver may be a video player for regenerating video information recorded in a recording medium, and the processing terminal may be designed to make at least one of requests of controlling on and off of the video player, changing the audio channel in a sound multiplex system, controlling the level of regenerative sound volume, setting the time, setting the operation of reservation, inserting the recording medium, ejecting the recording medium, playing the recording medium, stopping the play of the recording medium, fast-forwarding the recording medium, rewinding the recording medium, pausing the play of the recording medium, canceling the pause of the play of the recording medium, as the operational request information.

The video player may be a video cassette player and the recording medium may be a video cassette.

The video player may be a video cassette player and the recording medium may be a video cassette.

The receiver may be provided with a telephone set and a telephone controller for receiving the additional information from the CATV distributor and controlling the telephone set, and the processing terminal may be designed to make at least one of requests of setting the dial of the telephone set, setting the automatic answering telephone function, canceling the automatic answering telephone function, and regenerating message of the automatic answering telephone, as the operational request information.

The receiver may be provided with a facsimile apparatus and a facsimile controller for receiving the additional information from the CATV distributor and controlling the facsimile apparatus, and the processing terminal may be designed to make at least one of requests of controlling on and off of the facsimile apparatus, transmitting data generated by the processing terminal to the facsimile apparatus, and transmitting the data generated by the processing terminal to another facsimile apparatus through the facsimile apparatus, as the operational request information.

The processing terminal may be a personal computer receiving the additional information from the CATV distributor and controlling itself, and the personal computer may be designed to make a request of controlling on and off of the personal computer, as the operational request information.

The CATV distributor may have a line communication means for transmitting and receiving the additional information, for example, to and from the processing terminal through a communication line except channels for CATV distribution, and operate according to the additional information transmitted and received to and from the processing terminal by the line communication means.

The line communication means may include a means for transmitting and receiving the additional information to and from an external apparatus other than subscribers' stations through the communication line, and the CATV distributor may operate according to the additional information transmitted and received to and from the external apparatus by the line communication means.

The CATV distributor may have a line communication means transmitting and receiving the additional information to and from the processing terminal through a communication line except channels for CATV distribution, and when the additional information received by the line communication means is the inquiry request information, transmit the status request information to the processing terminal, the status information generating means may generate the status information for causing the processing terminal to output sound and/or text, and the line communication means may further transmits the status information, generated by the status information generating means, to the processing terminal.

The line communication means may include a means for transmitting and receiving the additional information to and from an external apparatus other than subscribers' station through a communication line except channels for CATV distribution, the CATV distributor may include a means for transmitting the status request information to the external apparatus when the additional information received by the line communication means is the inquiry request information, the status information generating means may include a means for generating the status information for causing the external apparatus to output sound and/or text, and the line communication means may further transmit the status information, generated by the status information generating means, to the external apparatus.

The receiver may include a TV receiver, a telephone set, and a telephone controller for transmitting and receiving the additional information to and from the CATV distributor and controlling the telephone set, the telephone controller may transmit calling information, indicating a telephone call, as the additional information to the CATV distributor when the telephone set is called, the CATV distributor may transmit calling notifying information for notifying the telephone call to the telephone set when the additional information received by the second communication means is the calling information, the TV receiver may include a means for displaying that the telephone set is called on a screen of the TV receiver when the additional information received therein is the calling notifying information.

A CATV distributor according to a third aspect of the present invention comprises: a transmission means for transmitting at least either of broadcasting information and additional information other than the broadcasting information to at least one of receivers located at a subscriber's side; a communication means for transmitting and receiving the additional information to and from a processing terminal located at the subscriber's side; and an operational command generating means which, when the additional information received by the communication means is operational request information, generates operational command information for commanding an operation of the receiver according to the operational request information and provides the operational command information, as additional information for the receiver, to the communication means.

A processing terminal according to a fourth aspect of the present invention comprises: an operational request input means for inputting operational request information requesting an operation of at least one of a receiver receiving broadcasting information and additional information other than the broadcasting information and other apparatus which are located at a subscriber's side; a communication means for transmitting the operational request information, inputted from the operational request input means, as the additional information to a CATV distributor located in a CATV central station; and a responding means for receiving the additional information from the CATV distributor and responding the additional information.

A receiver according to fifth aspect of the present invention comprises: a communication means for receiving broadcasting information and additional information other than the broadcasting information from a CATV distributor located in a CATV central station, and an operating means which, when the additional information received by the communication means is operational command information for commanding an operation of the receiver, operates in response to the operational information.

In the CATV system according to the first aspect of the present invention, as the additional information is transmitted from the processing terminal to the CATV distributor, the CATV distributor processes the additional information and, according to a result of the processing, transmits the additional information at least either of the receiver and processing terminal at the subscriber's side. The process according to the additional information is performed in the receiver and the processing terminal.

In the CATV system according to the second aspect of the present invention, the communications for additional information between the processing terminal and the CATV distributor, between the CATV distributor and the receiver, and between the CATV distributor and the processing terminal is conducted through additional information channels in a transmission line for multiple channels which include broadcasting channels for transmitting broadcasting information and the additional information channels for transmitting additional information from the CATV distributor and the receiver.

The CATV distributor according to the third aspect of the present invention transmits at least either of broadcasting information and additional information other than the broadcasting information to at least one of the receiver located at the subscriber's side, transmits and receives the additional information to and from the processing terminal located at the subscriber's side, and when the additional information received therein from the processing terminal is operational request information requesting an operation of said receiver, transmits operational command information, for commanding the operation of the receiver, as the additional information to the receiver.

The processing terminal according to the fourth aspect of the present invention inputs operational request information requesting an operation of at least either of a receiver receiving broadcasting information and additional information other than the broadcasting information and other apparatus located at the subscriber's side, transmits the operational request information as the additional information to the CATV distributor located in the CATV central station, then receives the additional information from said CATV distributor, and responds to the additional information.

The receiver according to the fifth aspect of the present invention receives broadcasting information and the additional information other than the broadcasting information from the CATV distributor located in the CATV central station, and when the additional information is operational command information for commanding an operation of the receiver, operates in response to the operational command information.

BRIEF DESCRIPTION OF THE DRAWINGS

FIG. 6 is a view illustrating the format of additional information used in the CATV system as shown in FIG. 3;

FIG. 7 is a view illustrating a part of a code used for the additional information of CATV system as shown in FIG. 3;

FIG. 8 is a view illustrating a first form of the relation between CATV broadcasting channels and control channels used for the additional information in the CATV system as shown in FIG. 3;

FIG. 9 is a view illustrating a second form of the relation between the CATV broadcasting channels and the control channels used for the additional information in the CATV system as shown in FIG. 3;

FIG. 10 is a flow chart showing the flow of the processing of a CATV distributor in the CATV system as shown in FIG. 3;

FIG. 11 is a sequence diagram illustrating the steps of processing for operating a TV receiver in the CATV system as shown in FIG. 3;

FIG. 12 is a sequence diagram illustrating the steps of processing for operating a video cassette recorder in the CATV system as shown in FIG. 3;

FIG. 13 is a sequence diagram illustrating the steps of processing for operating a video disc in the CATV system as shown in FIG. 3;

FIG. 14 is a sequence diagram illustrating the steps of processing for operating a telephone set in the CATV system as shown in FIG. 3;

FIG. 15 is a sequence diagram illustrating the steps of processing for operating a facsimile apparatus in the CATV system as shown in FIG. 3;

FIG. 16 is a sequence diagram illustrating the steps of processing for operating the TV receiver by telephone in the CATV system as shown in FIG. 3;

FIG. 17 is a sequence diagram illustrating the steps of processing for linking the TV receiver to the telephone set in the CATV system as shown in FIG. 3;

FIG. 18 is a view illustrating a display of the TV receiver in the sequence of FIG. 17;

FIG. 19 is a flow chart for explaining the first half of the flow of processing for operating the video cassette recorder in the CATV system as shown in FIG. 3; and FIG. 20 is a flow chart for explaining the latter half of the flow of processing for operating the video cassette recorder in the CATV system as shown in FIG. 3.

DETAILED DESCRIPTION OF THE PREFERRED EMBODIMENTS

Hereinafter, preferred embodiments for a CATV system of the present invention will be described with reference to the attached drawings.

[First Embodiment]

Figure 1:
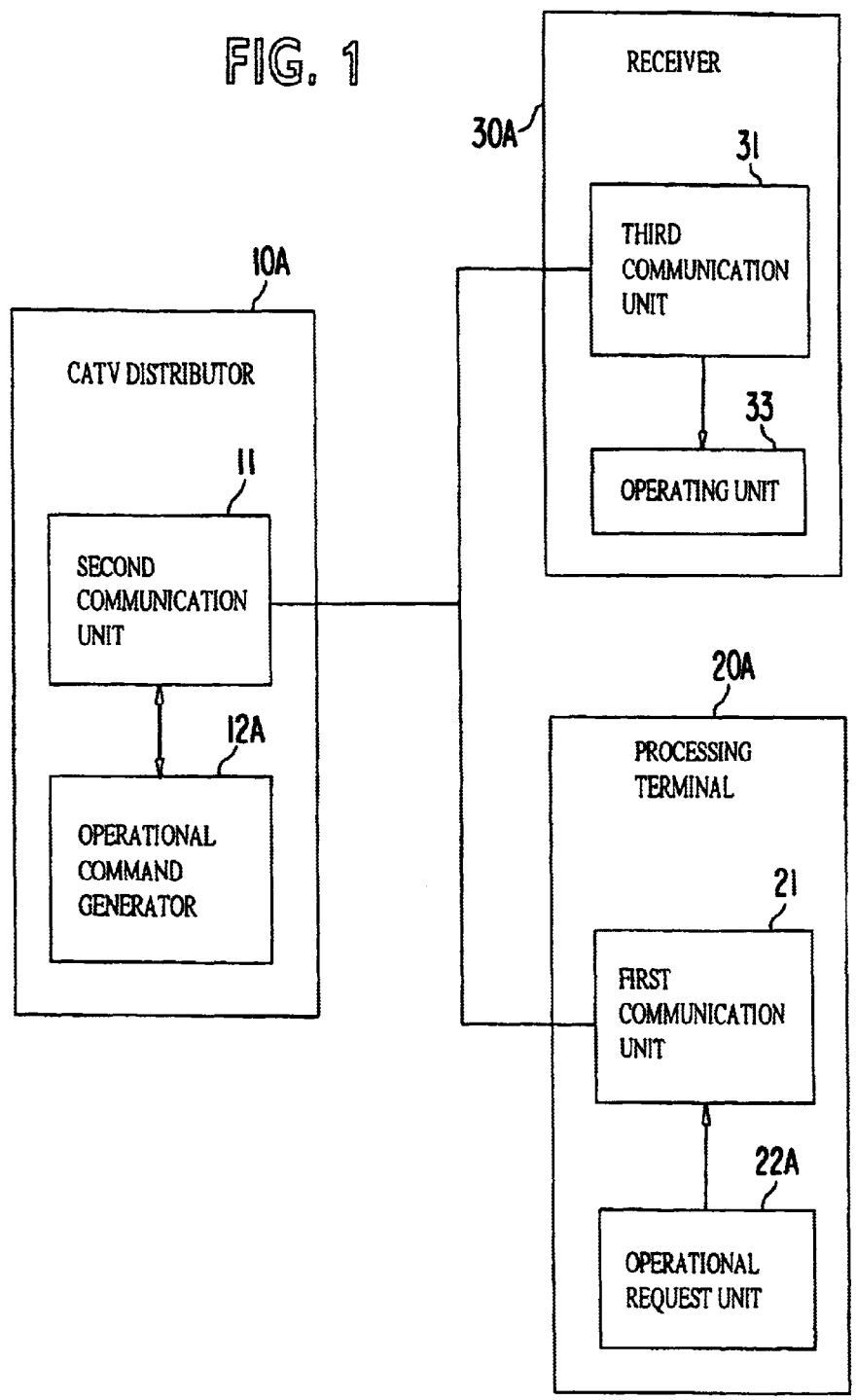
FIG. 1 is a block diagram showing the conceptual structure of a CATV system according to a first embodiment of the present invention.

The conceptual structure of a CATV system according to a first embodiment of the present invention is shown in FIG. 1.

The CATV system shown in FIG. 1 comprises a CATV distributor 10A, a processing terminal 20A, and a receiver 30A.

The CATV distributor 10A is located in a CATV central station as a distributing station of CATV broadcasting to distribute broadcasting information to respective subscribers and to transmit and receive additional information other than the broadcasting information to and from at least the respective subscribers. The additional information includes communicating information for the distribution of information.

The processing terminal 20A is located at each subscriber's side to transmit and receive the additional information to and from the CATV distributor 10A.

The receiver 30A is located at each subscriber's side to receive the broadcasting information and the additional information from the CATV distributor 10A.

The processing terminal 20A has a first communication unit 21 and an operation request unit 22A.

The operation request unit 22A inputs operational request information for requesting an operation of the receiver 30A. The first communication unit 21 transmits the operational request information, inputted from the operation request unit 22A, as the additional information to the CATV distributor 10A.

The CATV distributor 10A has a second communication unit 11 and a command generator 12A.

The command generator 12A generates operational command information for commanding the operation of the receiver 30A in response to the operational request information. The second communication unit 11 transmits and receives the additional information to and from the processing terminal 20A and the receiver 30A, respectively, when the received additional information is the operational request information, outputs the operational request information to the command generator 12A and further transmits the operational command information, generated by the command generator 12A as the additional information to the receiver 30A.

The receiver 30A has a third communication unit 31 and the operating unit 33. The third communication unit 31 receives the additional information. The operating unit 33 performs the operation notified by the operational command information when the additional information received by the third communication unit 31 is the operational commanding information.

In the CATV system as shown in FIG. 1, the operational request information inputted from the operation request unit 22A in the processing terminal 20A is transmitted from the first communication unit 21 to the second communication unit 11 of the CATV distributor 10A. In the CATV distributor 10A, the additional information is received by the second communication unit 11 and when the additional information is the operational request information, the command generator 12A generates the operational command information corresponding to the operational request information. The operational command information is transmitted to the third communication unit 31 of the receiver 30A through the second communication unit 11. In the receiver 30A, when the third communication unit 31 receives the operational command information of the receiver 30A, the operating unit 33 performs the predetermined operation of the receiver 30A in response to the operational command information.

It should be noted that the aforementioned processing terminal 20A can receive operational request information requesting an operation of the terminal 20 A itself by the operation request unit 22A. At this point, in the CATV distributor 10A, when the additional information received by the second communication unit 11 is the operational request information requesting the operation of the processing terminal 20, the command generator 12A generates operational command information for operating the processing terminal 20A based on the operational request information. The operational command information generated by the command generator 12A is transmitted from the second communication unit 11 as the additional information to the processing termination 20A. In the processing terminal 20A, the operational command information for the processing terminal 20A is received and processed as the additional information by the first communication unit 21 to perform the operation in response to the operational command information.

[Second Embodiment]

Figure 2:
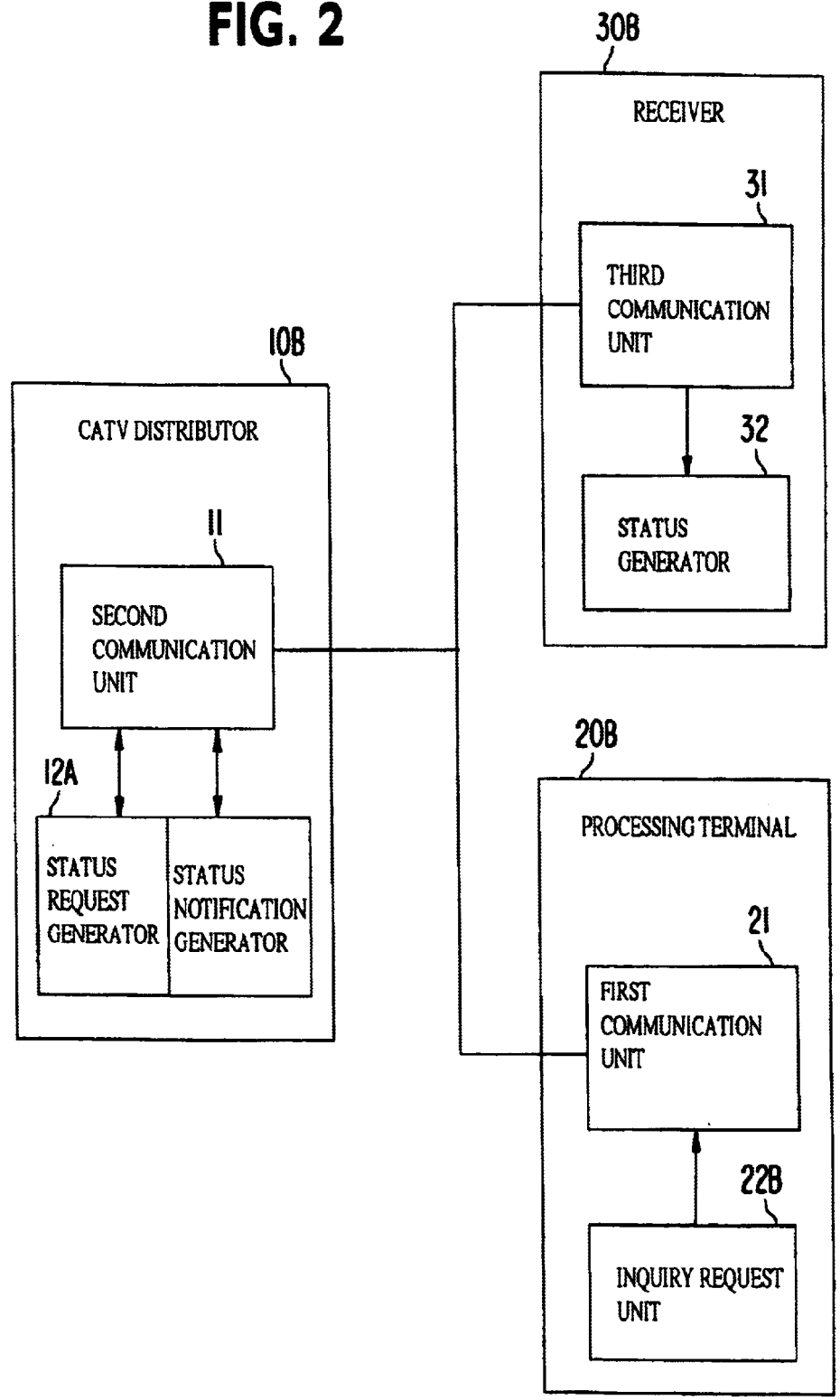
FIG. 2 is a block diagram showing the conceptual structure of a CATV system according to a second embodiment of the present invention.

The conceptual structure of a CATV system according to a second embodiment of the present invention is shown in FIG. 2.

The CATV system shown in FIG. 2 comprises a CATV distributor 10B, a processing terminal 20B, and a receiver 30B. In the CATV system shown in FIG. 2, the same parts as those of the CATV system shown in FIG. 1 will be marked by the same reference numerals, respectively, and the description about the same parts will be omitted.

The CATV distributor 10B is located in a CATV central station as a distributing station of CATV broadcasting to distribute broadcasting information to respective subscribers and to transmit and receive additional information other than the broadcasting information to and from at least the respective subscribers. The additional information includes communicating information for the distribution of information.

The processing terminal 20B is located at each subscriber's side to transmit and receive the additional information to and from the CATV distributor 10B.

The receiver 30B is located at each subscriber's side to receive the broadcasting information and to transmit and receive the additional information from and to the CATV distributor 10A.

The processing terminal 20A has a first communication unit 21 and an inquiry request unit 22B.

The inquiry request unit 22B inputs inquiry request information for requesting to inquire the status of the receiver 30B. The first communication unit 21 transmits the inquiry request information, inputted by the inquiry request unit 22B, as the additional information to the CATV distributor 10B, and when status notifying information from the CATV distributor 10B is obtained, receives and processes the status notifying information to display the status or the like.

The CATV distributor 10B has a second communication unit 11, a status request generator 12B, and a status notification generator 12C.

The status request generator 12B generates status request information for requesting the information about the status of the receiver in response to the inquiry request information. The status notifying information unit 12C generates status notifying information for notifying the status in response and corresponding to status information. The second communication unit 11 transmits and receives the additional information to and from the processing terminal 20B and the receiver 30B, when the received additional information is the inquiry request information, outputs the inquiry request information to the status request generator 12B, and when the additional information is the status information, outputs the status information to the status notification generator 12C and transmits the status notifying information, generated by the status notification generator 12C, as the additional information to the processing termination 20B.

The receiver 30B has a third communication unit 31 and the status generator 32.

The third communication unit 31 receives the additional information. The status generator 32 generates the status information of the receiver 30B when the additional information received by the third communication unit 31 is the status request information.

In the CATV system as shown in FIG. 2, the inquiry request information inputted from the inquiry request unit 22B in the processing terminal 20B is transmitted from the first communication unit 21 to the second communication unit 11 of the CATV distributor 10B. In the CATV distributor 10B, the additional information is received by the second communication unit 11 and when the additional information is the inquiry request information, the status request generator 12B generates the status request information corresponding to the inquiry request information. The status request information is transmitted to the third communication unit 31 of the receiver 30B through the second communication unit 11. In the receiver 30B, when the third communication unit 31 receives the status request information to the receiver 30B, the status generator 32 generates the status information in response to the status of the receiver 30B and transmits the status information as the additional information to the communication unit of the CATV distributor 10B. In the CATV distributor 10B, as the second communication unit 11 receives the status information of the receiver 30B as the additional information, the status notifying information is generated by the status notification generator 12C and transmitted to the first communication unit 21 of the processing terminal 20B as the additional information by the second communication unit 11. The first communication unit 21 receives and processes the status notifying information and then the display of the status of the receiver as requested is performed.

The CATV central station, having the CATV distributor 10A or 10B, and the subscribers' stations, each having the processing terminal 20A or 20B and the receiver 30A or 30B, are connected by transmission lines for multiple channels including broadcasting channels and additional information channels. The broadcasting channels may be used for distributing broadcasting information and the additional information channels may be used for transmitting and receiving additional information other than the broadcasting information.

The receiver 30A may be a TV receiver and the processing terminal 20A may be designed to make at least one of requests of controlling on and off of the TV receiver, changing the video channel, changing the audio channel, controlling the level of regenerative sound volume, and setting the time, as the operational request information.

The receiver 30A may be a video recorder for recording and regenerating video information to a recording medium and the processing terminal 20A may be designed to make at least one of requests of controlling on and off of the video recorder, changing the received video channel, changing the audio channel in a sound multiplex system, controlling the level of regenerative sound volume, setting the time, setting the operation of reservation, inserting the recording medium, ejecting the recording medium, playing the recording medium, stopping the play of the recording medium, fast-forwarding the recording medium, rewinding the recording medium, starting the record to the recording medium, stopping the record to the recording medium, pausing the play of the recording medium, canceling the pause of the play of the recording medium, pausing the record to the recording medium, and canceling the pause of the record to the recording medium, as the operational request information. The video recorder may be a video cassette recorder and the recording medium may be a video cassette. The video recorder may be a video disk recorder and the recording medium may be a video disk.

The recorder 30A may be a video player for regenerating video information recorded in a recording medium and the processing terminal 20A may be designed to make at least one of requests of controlling on and off of the video player, changing the audio channel in a sound multiplex system, controlling the level of regenerative sound volume, setting the time, setting the operation of reservation, inserting the recording medium, ejecting the recording medium, playing the recording medium, stopping the play of the recording medium, fast-forwarding the recording medium, rewinding the recording medium, pausing the play of the recording medium, and canceling the pause of the play of the recording medium, as the operational request information. The video player may be a video cassette player for playing a video cassette and the recording medium may be a video cassette. The video player may be a video disk player and the recording medium may be a video disk.

The receiver 30A may be provided with a telephone set and a telephone controller for receiving the additional information from the CATV distributor and controlling the telephone set and the processing terminal 20A may be designed to make at least one of requests of setting the dial of the telephone set, setting the automatic answering telephone function, canceling the automatic answering telephone function, and regenerating message of the automatic answering telephone, as the operational request information.

The receiver 30A may be provided with a facsimile apparatus and a facsimile controller for receiving the additional information from the CATV distributor and controlling the facsimile apparatus and the processing terminal 20A may be designed to make at least one of requests of controlling on and off of the facsimile apparatus, transmitting data generated by the processing terminal 20A to the facsimile apparatus, and transmitting the data generated by the processing terminal to another facsimile apparatus through the facsimile apparatus, as the operational request information.

The processing terminal 20A may be a personal computer which can receive the additional information from the CATV distributor 10A and control itself and the personal computer may be designed to make a request of controlling on and off the personal computer, as the operational request information.

[Third Embodiment]

Figure 3:
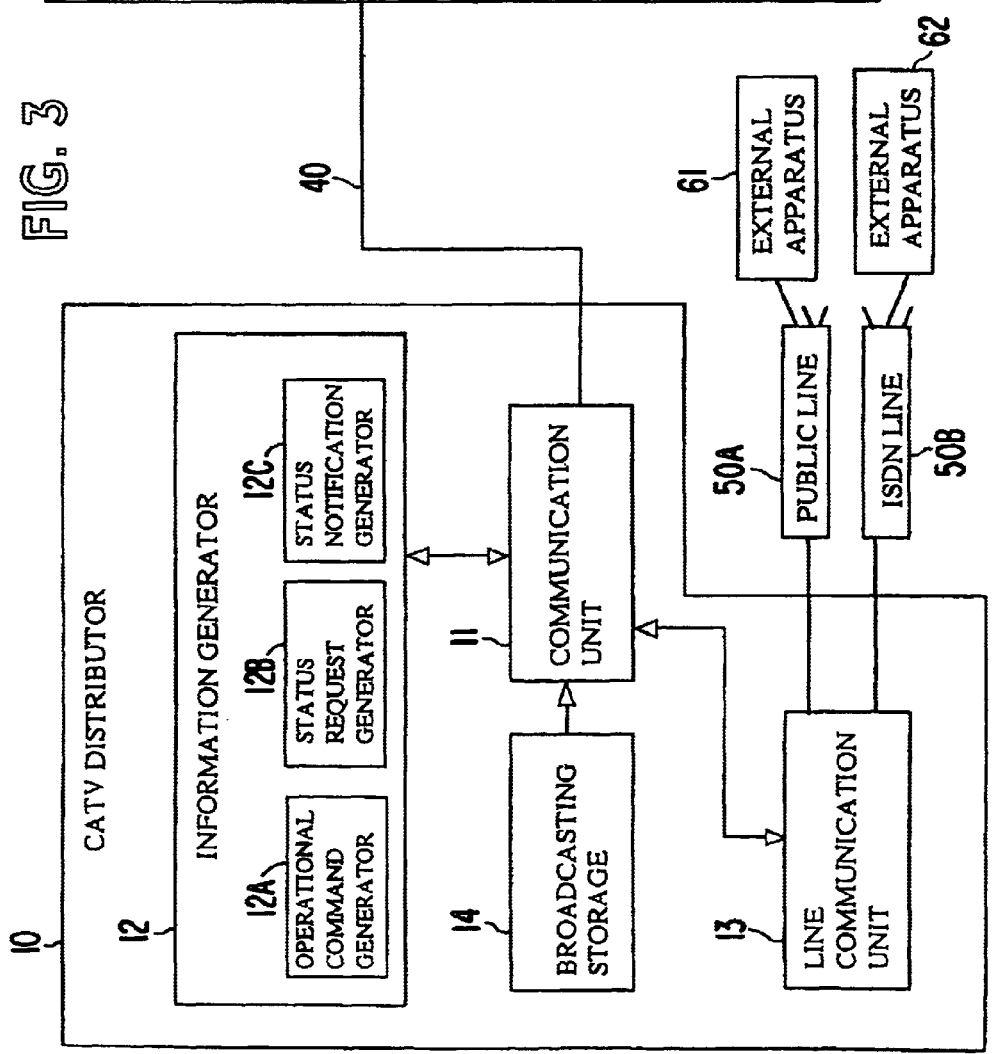
FIG. 3 is a block diagram showing the conceptual structure of a CATV system according to a third embodiment of the present invention.

The conceptual structure of a CATV system according to a third embodiment of the present invention is shown in FIG. 3.

Figure 4:
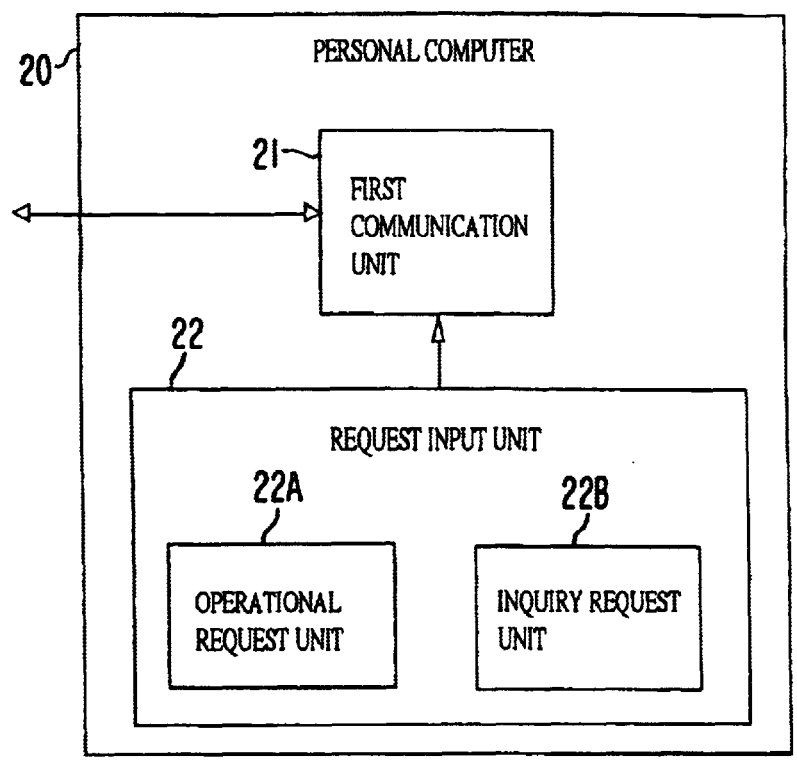
FIG. 4 is a block diagram showing the functional structure of a part of a personal computer used in the CATV system as shown in FIG. 3.
Figure 5:
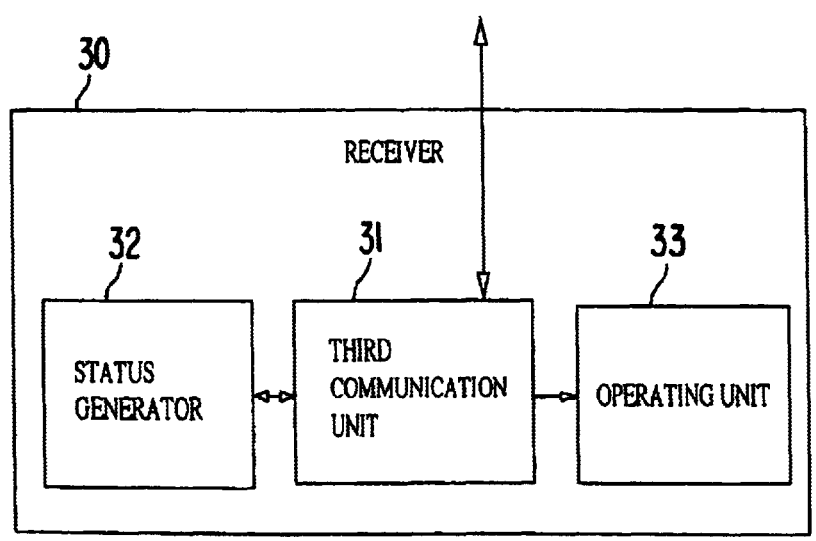
FIG. 5 is a block diagram showing the functional structure of a part of a receiver used in the CATV system as shown in FIG. 3.

The CATV system shown in FIGS. 3–5 is an embodied example provided with a combination of the functions of the systems as shown in FIG. 1 and FIG. 2 and further functions. In the CATV system shown in FIGS. 3–5, substantially the same parts as those of the CATV systems shown in FIGS. 1 and 2 will be marked by the same reference numerals, respectively, and the description about the same parts will be omitted.

The CATV system as shown in FIG. 3 is provided with a CATV distributor 10, a personal computer (PC) 20, a TV receiver 34, a video cassette recorder (VCR) 35, a video disk apparatus 36, a telephone controller 37A, a telephone set 37B, a facsimile controller 38A, and a facsimile apparatus 38B.

The CATV distributor 10 is located in a CATV central station and is connected to subscribers' stations via cable 40, such as coaxial cable or optical fiber cable, building up distributing transmission lines, wherein the subscribers' stations are each provided with the personal computer (PC) 20, the TV receiver 34, the video cassette recorder (VCR) 35, the video disk apparatus 36, the telephone controller 37A, the telephone set 37B, the facsimile controller 38A, and the facsimile apparatus 38B.

The personal computer 20 corresponds to the processing terminal. A work station or an electronic organizer can be substituted for the personal computer 20 as the processing terminal. The TV receiver 34, the VCR 35, the video disk apparatus 36, the telephone controller 37A, the telephone set 37B, the facsimile controller 38A, and the facsimile apparatus 38B correspond to the receiver. Hereinafter, these will be referred to as the receivers 34–38B as the genetic name. Not all these receivers 34–38B are necessary.

The personal computer 20 and the receivers 34–38B are assumed to be owned by the same subscriber of the CATV system.

In FIG. 3, the CATV distributor 10 is connected to an external apparatus 61 through an analog public line 50A such as an analog telephone line and connected to an external apparatus 62 through an integrated service digital network (ISDN) line 50B.

The CATV distributor 10 is provided with a second communication unit 11, information generator 12, a circuit communication unit 13, and a broadcasting storage 14. The information generator 12 has an operational command generator 12A, a status request generator 12B, and a status notification generator 12C.

The personal computer 20 as the processing terminal is provided with a communication unit 21 and a request input unit 22. Furthermore, the request input 22 has an operational request unit 22A and an inquiry request unit 22B.

Every one of the TV receiver 34, the VCR 35, the video disk apparatus 36, the telephone set connected to the telephone controller 37, and the facsimile apparatus connected to the facsimile controller 38A is a receiver and has a common structure for the system according to the present invention.

The description will now be made as regard to the personal computer 20 as shown in FIG. 4.

As shown in FIG. 4, the communication unit 21 corresponds to the first communication unit 21 for communicating with the request information input 22 and the cable 40.

The operational request unit 22A of the request information input 22 inputs operational request information for any operation of respective receivers 34–38B or the personal computer 20 itself through keys (not shown).

The inquiry request unit 22B of the request information input 22 inputs inquiry request information for requesting to inquire the status of the respective receivers 34–38B through the keys.

The communication unit 21 transmits the operational request information, inputted from the operational request unit 22A, as the additional information to the CATV distributor 10 through the cable 40, and transmits the inquiry request information, inputted from the inquiry request unit 22B, as the additional information to the CATV distributor 10 through the cable 40.

The description will now be made as regard to the receiver 30, which may be the respective receivers 34–38B, as shown in FIG. 5.

As shown in FIG. 5, the communication unit 31 corresponds to the third communication unit for communicating with a status generator 32, an operating unit 33 and the cable 40.

The status generator 32 generates status information for notifying the status as requested when the additional information received by the communication unit 31 is notification request information for requesting to notify the status of the receiver 30. The status information generated by the status generator 32 is transmitted from the communication unit 31 to the CATV distributor.

The operating unit 33 performs the operation indicated by the operational command information when the additional information received by the communication unit 31 is operational command information for commanding the operation of the receiver 30. Since the details of the operation indicated by the operational command information are depend on the kind of the receiver, the details will be described with regard to the respective receivers 34–38B later. It should be noted that the operational command information is generated in the CATV distributor 10 according to the operational request information inputted to the operational request unit 22A of the personal computer 20.

The TV receiver 34 displays the broadcasting information transmitted from the CATV distributor 10 on its screen. The TV receiver 34 is designed to perform at least one of operations of on-off controlling, changing the video channel, changing the changing the audio channel, controlling the level of regenerative sound volume, and setting the time, according to the operational request information.

The video cassette recorder 35 records the broadcasting information transmitted by the CATV distributor 10. The video cassette recorder 35 is designed to perform at least one of operations of on-off controlling, changing the video channel, changing the changing the audio channel, controlling the level of regenerative sound volume, setting the time, setting the reservation time, inserting a video cassette (not shown) as a recording medium, ejecting the video cassette, playing the video cassette, stopping the play of the video cassette, fast-forwarding the video cassette, rewinding the video cassette, starting the record to the video cassette, pausing the play of the video cassette, and canceling the pause of the play of the video cassette, according to the operational command information.

The video disk apparatus 36 is designed to perform at least one of operations of on-off controlling, changing the video channel, changing the changing the audio channel, controlling the level of regenerative sound volume, setting the time, setting the reservation time, inserting a recording medium (not shown), ejecting the recording medium, playing the recording medium, stopping the play of the recording medium, fast-forwarding the recording medium, rewinding the recording medium, starting the record to the recording medium, pausing the play of the recording medium, and canceling the pause of the play of the recording medium, according to the operational command information.

The telephone controller 37 monitors and controls the telephone set 37B. The telephone controller 37, for example, detects a calling to the telephone set 37B to transmit calling information, for indicating the calling, as the additional information to the CATV distributor 10.

The facsimile controller 38A monitors and controls the facsimile apparatus 38B. The facsimile controller 38A, for example, detects a calling to the facsimile apparatus 38B to transmit calling indication information, for indicating the calling, as the additional information to the CATV distributor 10.

The description will now be made as regard to the CATV distributor 10 as shown in FIG. 3.

As shown in FIG. 3, the communication unit 21 corresponds to the second communication unit and communicates with the information generator 12, the circuit communication unit 13, and the broadcasting storage 14.

The communication unit 11 transmits the broadcasting information stored in the broadcasting storage 14 to the TV receiver 34 and the video cassette recorder 35 through the cable 40.

Furthermore, the communication unit 11 transmits and receives the additional information to and from the respective receivers 34–38B and the personal computer 20 through control channels assigned in the CATV broadcasting band.

It should be noted that the additional information is information used for the distribution of information. The additional information is structured in a format with elements "originating side identifier", "addressee identifier", "user ID and password", "content of transmission", and "status of the receiver". The elements are assigned with codes shown in FIG. 7, respectively. For example, a code "2001" is assigned for the "originating side identifier" in case where the originating side is the VCR and a code "0000" is assigned for the "content of transmission" in case where the content is "to turn on the power".

For assigning the control channels, there is a first method as shown in FIG. 8 and a second method as shown in FIG. 9. In the first method, the control channels are assigned in a band between a (N−1) channel band and a N channel band and a band between the N channel band and a (N+1) channel band, respectively. In the second method, the control channels are assigned in bands located at the lower end and the upper end of the CATV broadcasting band, respectively. Since the amount of the additional information is significantly smaller than that of the broadcasting information, the width of each band for the control channels are also significantly smaller than that of the broadcasting channel.

When the additional information received by the communication unit 11 is the operational request information, the operational command generator 12A of the information generator 12 generates operational command information for operating the respective receivers 34–38B according to the operational request information. The operational command information thus generated is transmitted as the additional information from the communication unit 11 to the respective receivers 34–38B or the personal computer 20.

When the additional information received by the communication unit 11 is the inquiry request information, the status request generator 12B of the information generator 12 generates status request information for requesting the notification about the status of the receiver in response to the inquiry request information. The status request information thus generated is transmitted as the additional information from the communication unit 11 to the respective receivers 34–38B.

When the additional information received by the communication unit 11 is the status information, the status notifying information unit 12C of the information generator 12 generates status notifying information for notifying the status of the receiver 30 as requested according to the status information. The status notifying information thus generated is transmitted as the additional information from the communication unit 11 to the personal computer 20.

The circuit communication unit 13 transmits and receives the additional information to and from the external apparatus 61 through the public line 50A and transmits and receives the additional information to and from the external apparatus 62 through the ISDN line 50B.

The broadcasting storage 14 stores broadcasting data including visual information for independent broadcasts and normal TV broadcasts. The stored broadcasting data are transmitted as the broadcasting information from the communication unit 11 to the TV receiver 34, the video cassette recorder 35, and the personal computer 20.

Hereinafter, the description will be made as regard to the operation of the CATV system as shown in FIG. 3.

FIG. 10 shows a flow chart of the processing of a CATV distributor in the CATV system.

As the communication unit 11 of the CATV distributor 10 receives the operational request information (Step S1201), the user ID and the password included in the operational request information are queried (Step S1202) to determine whether the combination of the user ID and the password is correct, i.e. whether the originating user is one of the CATV subscribers (Step S1203). When it is determined that the combination is incorrect in Step S1203, the procedure is canceled (Step S1204).

On the other hand, when it is determined that the combination is correct in Step S1203, the procedure proceeds to determine whether the operational request information is set correctly (Step S1205). When it is determined that the operational request information is set incorrectly, the procedure is canceled (Step S1206).

On the other hand, when it is determined that the operational request information is set correctly, the procedure proceeds to specify the originating user from the user ID queried in Step S1202 (Step S1207).

Then, the communication unit 11 transmits the operational command information generated according to the operational request information received in Step S1201 to a receiver subject to the operation (Step S1208).

FIG. 11 illustrates process sequence for operating a TV receiver 34 through the personal computer 20.

First, the personal computer 20 transmits the operational request information for operating the TV receiver 34 to the CATV distributor through the cable 40 (Step S1301).

The CATV distributor 10 transmits the operational command information, generated according to the operational request information transmitted from the personal computer 20, to the TV receiver through the cable 40 (Step S1302). At this point, the steps shown in FIG. 10 are taken in the CATV distributor 10.

The TV receiver 34 operates according to the operational command information received therein from the CATV distributor 10 (Step S1303).

FIG. 12 illustrates the process sequence for operating the video cassette recorder through the personal computer 20.

First, the personal computer 20 transmits the operational request information for operating the video cassette recorder 35 to the CATV distributor 10 through the cable 40 (Step S1401).

The CATV distributor 10 transmits the operational command information, generated according to the operational request information transmitted from the personal computer 20, to the video cassette recorder 35 through the cable 40 (Step S1402). At this point, the steps shown in FIG. 10 are taken in the CATV distributor 10.

The video cassette recorder 35 operates according to the operational command information received therein from the CATV distributor 10 (Step S1403).

FIG. 13 illustrates the process sequence for operating the video disk apparatus 36 through the personal computer 20.

First, the personal computer 20 transmits the operational request information for operating the video disk apparatus 36 to the CATV distributor 10 through the cable 40 (Step S1501).

The CATV distributor 10 transmits the operational command information, generated according to the operational request information transmitted from the personal computer 20, to the video disk apparatus 36 through the cable 40 (Step S1502). At this point, the steps shown in FIG. 10 are performed in the CATV distributor 10.

The video disk apparatus 36 operates according to the operational command information received therein from the CATV distributor 10 (Step S1503).

FIG. 14 illustrates the process sequence for operating the telephone set 37B through the personal computer 20.

First, the personal computer 20 transmits the operational request information for operating the telephone set 37B to the CATV distributor 10 through the cable 40 (Step S1601).

The CATV distributor 10 transmits the operational command information, generated according to the operational request information transmitted from the personal computer 20, to the telephone controller 37A through the cable 40 (Step S1602). At this point, the steps shown in FIG. 10 are performed in the CATV distributor 10.

The telephone controller 37A controls the telephone set 37B according to the operational command information received therein from the CATV distributor 10 (Step S1603). As a result of this, the telephone set 37B operates the operational command information received by the telephone controller 37A (Step S1604).

FIG. 15 illustrates the process sequence for operating the facsimile apparatus 38B through the personal computer 20.

First, the personal computer 20 transmits the operational request information for operating the facsimile apparatus 38B to the CATV distributor 10 through the cable 40 (Step S1701).

The CATV distributor 10 transmits the operational command information, generated according to the operational request information transmitted from the personal computer 20, to the facsimile controller 38A through the cable 40 (Step S1702). At this point, the steps shown in FIG. 10 are performed in the CATV distributor 10.

The facsimile controller 38A controls the facsimile apparatus 38B according to the operational command information received therein from the CATV distributor 10 (Step S1703). As a result of this, the facsimile apparatus 38B operates the operational command information received by the facsimile controller 38A (Step S1704).

FIG. 16 illustrates a process sequence for operates the TV receiver through the external apparatus 61 such as a telephone set connected with the public line 50A.

First, the connection between the telephone set 61 and the CATV distributor 10 is established upon calling from the telephone set 61 (Step S1801). The user ID and the password inputted through push buttons of the telephone set 61 are transmitted to the CATV distributor 10 (Step S1802). The CATV distributor is further informed of a predetermined number, for inquiring whether the power of the TV receiver 34 is on or off, inputted through the push buttons (Step S1803).

The CATV distributor 10 transmits notification require information, for inquiring the status of the power of TV receiver, according to the information informed in Step S1802 and Step S1803 (Step S1804).

Then, according to the notification request information received from the CATV distributor 10, the TV receiver 34 transmits the status information for notifying the status of the power from the communication unit 31 to the CATV distributor 10 (Step S1805).

According to the status information transmitted from the TV receiver 34, the CATV distributor 10 answers, for example, by sounding "the power is on" (Step S1806). It should be noted that the CATV distributor 10 may answer by displaying the text "the power is on" instead of sounding it.

Then, for example, a predetermined number, for turning off the power of the TV receiver 34, inputted through the push buttons of the telephone set 61 is transmitted to the CATV distributor 10 (Step S1807).

According to the information transmitted to the CATV distributor 10 in Step S1807, the CATV distributor 10 transmits the operational command information, for commanding the operation for turning off the power of the TV receiver 34, from the communication unit 11 to the TV receiver 34 (Step S1808). As a result of this, the TV receiver 34 disconnects from the power source.

FIG. 17 illustrates a process sequence for operating connectedly the TV receiver and the telephone set 37B through the CATV distributor 10.

Assuming that there is a call on the telephone set 37B (Step S1901), the telephone controller 37A notifies the CATV distributor 10 that there is a call on the telephone set 37 (Step S1902).

The CATV distributor 10 transmits control information including broadcasting information and voice information, which indicats that there is a call on the telephone set 37B, from the communication unit 11 to the TV receiver 34 (Step S1903).

As a result of this, the TV receiver 34 displays, for example a screen as shown in FIG. 18. That is, the message display 92 indicating "there is a telephone call" appears in a lower portion of the broadcasting display 91. In addition, the TV receiver 34 also sounds the message "there is a telephone call".

Referring to FIG. 19 and FIG. 20, the description will be made as regard to the relation between the substantial process and the additional information, as an example where the video cassette recorder 35 is operated through the personal computer 20.

First, the personal computer 20 transmits inquiry information for inquiring the state of the power of the video cassette recorder 35 to the CATV distributor 10 (Step S2101). The inquiry information, i.e. the additional information, of this case is "7001,2001,1234MTL,0010, 0001" as shown in FIG. 19, meaning for example as follows: "7001" indicating that the originating side is the personal computer 20; "2001" indicating that the addressee is the video cassette recorder 35; "1234MTL" indicating the user ID and the password of the user; "0010" indicating that the content of the transmission is "the status transmission"; and "0001" indicating the status information "whether the power is on". In this case, the addressee is the video cassette recorder 35 as the final addressee, not the CATV distributor 10.

The CATV distributor 10 transmits the notification request information, generated according to the inquiry information received in Step S2101, to the video cassette recorder 35 (Step S2102). The notification request information, i.e. the additional information, of this case is the same "7001,2001,1234MTL,0010,0001" as the case of Step S2101 as shown in FIG. 19.

Then, the video cassette recorder 35 transmits the status information indicating that the power is off to the CATV distributor 10 (Step S2103). The status information, i.e. the additional information, of this case is "2001,7001, 1234MTL,0011,0000" as shown in FIG. 19, meaning for example as follows: "2001" indicating that the originating side is the video cassette recorder 35; "7001" indicating that the addressee is the personal computer 20; "1234MTL" indicating the user ID and the password of the user; "0011" indicating that the content of the transmission is "the status transmission"; and "0000" indicating the status information "the power is off". In this case, the addressee is the personal computer 20 as the final addressee, not the CATV distributor 10.

Then, the CATV distributor 10 transmits the inquiry notifying information for notifying the status of the video cassette recorder 35 to the personal computer 20 (Step S2104). The inquiry notifying information, i.e. the additional information, of this case is the same "2001,7001, 1234MTL,0011,0000" as the case of Step 2103 as shown in FIG. 19.

The personal computer 20 transmits the operational request information for turning on the power of the video cassette recorder 35 to the CATV distributor 10 (Step S2105). The operational request information, i.e. the additional information, of this case is "7001,2001,1234MTL, 0000" as shown in FIG. 19, meaning for example as follows: "7001" indicating that the originating side is the personal computer 20; "2001" indicating that the addressee is the video cassette recorder 35; "1234MTL" indicating the user ID and the password of the user; and "0000" indicating the substance of the operation is "to turn on the power". In this case, the addressee is the video cassette recorder 35 as the final addressee, not the CATV distributor 10. There is nothing assigned for the status information.

Then, the CATV distributor 10 transmits the operational command information for turning on the power to the video cassette recorder 35 (Step S2106). The operational command information, i.e. the additional information of this case is the same "7001,2001,1234MTL,0000" as the case of Step S2105.

The video cassette recorder 35 turns on the power according to the operational command information received therein. There is no additional information to Step S2107.

The personal computer 20 transmits the operational information for starting recording of the video cassette recorder 35 to the CATV distributor 10 (Step S2108). The operational request information, i.e. the additional information, of this case is "7001,2001,1234MTL,0005" as shown in FIG. 20, meaning for example as follows: "7001" indicating that the originating side is the personal computer 20; "2001" indicating that the addressee is the video cassette recorder 35; "1234MTL" indicating the user ID and the password of the user; and "0005" indicating the substance of the operation is "to start recording". In this case, the addressee is the video cassette recorder 35 as the final addressee, not the CATV distributor 10. There is nothing assigned for the status information.

Then, the CATV distributor 10 transmits the operational command information for turning on the power to the video cassette recorder 35 (Step S2109). The operational command information, i.e. the additional information, of this case is the same "7001,2001,1234MTL,0005" as the case Step S2105 as shown in FIG. 20.

Then, the video cassette recorder 35 starts the recording according to the operational command information received therein (Step S2110). There is no additional information to Step S2110.

What is claimed is:

1. A broadcasting system, comprising:
   a distributor located in a central station and distributing broadcasting information and transmitting and receiving additional information other than said broadcasting information;
   a processing terminal transmitting said additional information to said distributor; and
   at least one receiver responding to said additional information input from said processing terminal and transmitted from said distributor,
   wherein said processing terminal includes:
   operational requesting means for inputting operational request information for requesting an operation of said receiver; and
   first communication means for transmitting said operational request information, inputted from said operational requesting means, as said additional information to said distributor, wherein said distributor includes:
operational command generating means for generating operational command information for commanding the operation of said receiver according to said operational request information; and
second communication means for transmitting and receiving said additional information, when said additional information is said operational request information, said second communication means providing said operational request information to said operational command generating means and transmitting said operational command information generated by said operational command generating means, as the additional information to said receiver,
wherein said receiver includes:
a third communication means for receiving said additional information; and
an operating means for operating in response to said operational command information when said additional information received by said third communication means is said operational command information,
wherein said receiver is provided with a telephone set and a telephone controller receiving said additional information from said distributor and controlling said telephone set, and
wherein said processing terminal makes at least one of requests of setting the dial of said telephone set, setting the automatic answering telephone function, canceling the automatic telephone function and regenerating message of the automatic answering telephone, as said operational request information which is additional information.

2. A broadcasting system, comprising:
a distributor located in a central station and distributing broadcasting information and transmitting and receiving additional information other than said broadcasting information;
a processing terminal transmitting said additional information to said distributor; and
at least one receiver responding to said additional information input from said processing terminal and transmitted from said distributor,
wherein said processing terminal includes:
operational requesting means for inputting operational request information for requesting an operation of said receiver; and
first communication means for transmitting said operational request information, inputted from said operational requesting means, as said additional information to said distributor,
wherein said distributor includes:
operational command generating means for generating operational command information for commanding the operation of said receiver according to said operational request information; and
second communication means for transmitting and receiving said additional information, when said additional information is said operational request information, said second communication means providing said operational request information to said operational command generating means and transmitting said operational command information generated by said operational command generating means, as the additional information to said receiver,
wherein said receiver includes:
a third communication means for receiving said additional information; and
an operating means for operating in response to said operational command information when said additional information received by said third communication means is said operational command information,
wherein said receiver is provided with a facsimile apparatus and a facsimile controller receiving said additional information from said distributor and controlling said facsimile apparatus; and
wherein said processing terminal makes at least one of requests of controlling on and off of said facsimile apparatus, transmitting data generated by said processing terminal to said facsimile apparatus, and transmitting the data generated by said processing terminal to another facsimile apparatus through said facsimile apparatus, as said operational request information which is additional information.

3. A broadcasting system, comprising:
a distributor located in a central station and distributing broadcasting information and transmitting and receiving additional information other than said broadcasting information;
a processing terminal transmitting said additional information to said distributor; and
at least one receiver responding to said additional information input from said processing terminal and transmitted from said distributor,
wherein said processing terminal includes:
operational requesting means for inputting operational request information for requesting an operation of said receiver; and
first communication means for transmitting said operational request information, inputted from said operational requesting means, as said additional information to said distributor,
wherein said distributor includes:
operational command generating means for generating operational command information for commanding the operation of said receiver according to said operational request information; and
second communication means for transmitting and receiving said additional information, when said additional information is said operational request information, said second communication means providing said operational request information to said operational command generating means and transmitting said operational command information generated by said operational command generating means, as the additional information to said receiver,
wherein said receiver includes:
a third communication means for receiving said additional information; and
an operating means for operating in response to said operational command information when said additional information received by said third communication means is said operational command information,
wherein said receiver includes a TV receiver, a telephone set, and a telephone controller for transmitting and receiving said additional information to and from said distributor and controlling said telephone set,
said telephone controller transmitting calling information, indicating a telephone call, as said additional information to said distributor when said telephone set is called, said distributor transmitting calling notifying information for notifying the telephone call to said telephone set when said additional information received is said calling information, and said TV receiver including means for displaying that said telephone set is called on a screen of said TV receiver when said additional information received therein is said calling notifying information.

4. A receiver, comprising:

communication means for receiving broadcasting information and additional information other than said broadcasting information from a distributor located in a central station; and operating means which, when said additional information received by said communication means is operational command information for commanding an operation of said receiver, operates in response to said operational information, wherein said receiver further includes a telephone set that receives the status of other receivers as additional information and regenerates as voice messages.

* * * * *

UNITED STATES PATENT AND TRADEMARK OFFICE
CERTIFICATE OF CORRECTION

| | |
|---|---|
| PATENT NO. | : 6,766,527 B2 |
| APPLICATION NO. | : 08/643012 |
| DATED | : July 20, 2004 |
| INVENTOR(S) | : Seiji Tsutsui et al. |

Page 1 of 1

It is certified that error appears in the above-identified patent and that said Letters Patent is hereby corrected as shown below:

On Title Page (56) of patent, under "OTHER PUBLICATIONS", plesae add the following:

--Office Action mailed March 4, 2003 by the JPO & translation thereof, in corresponding Japanese Patent Application No. H08-170478--.

Signed and Sealed this

Fourth Day of September, 2007

JON W. DUDAS
*Director of the United States Patent and Trademark Office*